US011878238B2

(12) United States Patent
Cappello et al.

(10) Patent No.: US 11,878,238 B2
(45) Date of Patent: Jan. 23, 2024

(54) SYSTEM AND METHOD FOR GENERATING AN INPUT SIGNAL

(71) Applicant: Sony Interactive Entertainment Inc., Tokyo (JP)

(72) Inventors: Fabio Cappello, London (GB); Michael Adam Kavallierou, Buresshill/Sussex (GB)

(73) Assignee: Sony Interactive Entertainment Inc., Tokyo (JP)

(*) Notice: Subject to any disclaimer, the term of this patent is extended or adjusted under 35 U.S.C. 154(b) by 92 days.

(21) Appl. No.: 16/436,122

(22) Filed: Jun. 10, 2019

(65) Prior Publication Data
US 2019/0381401 A1 Dec. 19, 2019

(30) Foreign Application Priority Data
Jun. 14, 2018 (GB) ..................................... 1809755

(51) Int. Cl.
*A63F 9/24* (2006.01)
*A63F 11/00* (2006.01)
*G06F 13/00* (2006.01)
*G06F 17/00* (2019.01)
*A63F 13/40* (2014.01)
*A63F 13/22* (2014.01)
*A63F 13/28* (2014.01)
*A63F 13/35* (2014.01)
*A63F 13/53* (2014.01)

(52) U.S. Cl.
CPC .............. *A63F 13/40* (2014.09); *A63F 13/22* (2014.09); *A63F 13/28* (2014.09); *A63F 13/35* (2014.09); *A63F 13/53* (2014.09)

(58) Field of Classification Search
CPC .......... A63F 13/22; A63F 13/28; A63F 13/35; A63F 13/40; A63F 13/53; G07F 17/32; G07F 17/3214; G07F 17/3233
USPC .............................. 463/36, 1, 20, 22, 30, 39
See application file for complete search history.

(56) References Cited

U.S. PATENT DOCUMENTS 7,702,608 B1 * 4/2010 Bererton ................ A63F 13/211
706/46
10,068,557 B1 * 9/2018 Engel ....................... G10H 7/10
2005/0245303 A1 11/2005 Graepel
(Continued)

OTHER PUBLICATIONS

Combined examination and Search Report for corresponding GB Application No. 1809755.0, 3 pages, dated Jan. 18, 2019.
(Continued)

*Primary Examiner* — Adetokunbo O Torimiro
(74) *Attorney, Agent, or Firm* — Matthew B. Dernier, Esq.

(57) ABSTRACT

A system for generating an input signal for a video game includes: a receiving unit configured to receive a video game output signal output by a video game playing device during the playing of a video game; a reasoning model configured to determine an action to take within the video game based on the received video game output signal, the reasoning model being configured to generate a representation of the determined action that is independent of the video game; and an encoding unit configured to translate the representation into an input signal and to provide the input signal to a video game playing device at which the video game is being played, thereby causing the determined action to be performed within the video game.

13 Claims, 6 Drawing Sheets

(56) References Cited

U.S. PATENT DOCUMENTS

| | | | |
|---|---|---|---|
| 2007/0260567 A1 | 11/2007 | Funge | |
| 2009/0104992 A1* | 4/2009 | Kouno | A63F 13/57 463/36 |
| 2012/0100911 A1* | 4/2012 | Rejen | A63F 13/57 463/31 |
| 2013/0267319 A1* | 10/2013 | Kuhn | G06N 3/006 463/34 |
| 2014/0179421 A1* | 6/2014 | Quinn | A63F 13/00 463/31 |
| 2015/0018060 A1 | 1/2015 | Naveh | |
| 2015/0356401 A1* | 12/2015 | Vinyals | G06N 3/0454 706/15 |
| 2017/0076224 A1* | 3/2017 | Munawar | G06N 3/084 |
| 2017/0282063 A1 | 10/2017 | Krishnamurthy | |
| 2017/0328194 A1* | 11/2017 | Liu | G06N 3/0454 |
| 2018/0322394 A1* | 11/2018 | Nguyen | G06N 3/04 |
| 2019/0108448 A1* | 4/2019 | O'Malia | G06N 3/0472 |
| 2019/0354759 A1* | 11/2019 | Somers | G06T 7/70 |

OTHER PUBLICATIONS

Examination Report for corresponding GB Application No. 1809755.0, 5 pages, dated Feb. 19, 2021.

Communication Pursuant to Article 94(3) for corresponding EP Application No. 19177735.8, 6 pages, dated Sep. 30, 2021.

Extended European Search Report for corresponding EP Application No. 19177735.8, 7 pages, dated Nov. 11, 2019.

Volodymyr Mnih, et al., "Human Level Control Through Deep Reinforcement Learning" Nature, vol. 518, 13 pages., Feb. 26, 2015.

Samuel Alvernaz, et al., "Autoencoder-augments-Neuroevolution for Visual Doom Playing", arxiv.org, Cornell University Library, 8 pages, Jul. 12, 2017.

Kadu A. et al., "Real-Time 3D game using sixth sense and haptic technology" 2014 International Conference on Computation of Power, Energy, Information and Communication (ICCPEIC), pp. 449-454, Apr. 16, 2014.

* cited by examiner

SYSTEM AND METHOD FOR GENERATING AN INPUT SIGNAL

BACKGROUND OF THE INVENTION

Field of the Invention

The present disclosure relates to a system and method for generating a virtual input signal.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In some video games, players are provided with the option of playing against a virtual player. This allows players develop their skills within a game, without requiring the presence of, or a connection to, other real (i.e. human) players. For most video games, a virtual player (i.e. a so-called 'bot') is created by a games developer as part of the code defining the video game. This can be a difficult task in that the games developer needs to be able to anticipate many different situations within the game and the corresponding actions that the bot should take.

More recently, developers have taught bots to play games using artificial intelligence. A famous example of this is DeepMind's 'AlphaGo', which learnt to play the ancient Chinese board game of 'Go' using deep reinforcement learning. In 2016, AlphaGo beat the South Korean Go champion Lee Sedol, 4-1. DeepMind is also known for having taught a bot to play Atari games.

Whilst artificial intelligence has been demonstrably successful in teaching bots to play video games, there is still room for improvement. Generally, such bots are limited in the types of games that they are able to play successfully. Moreover, they often struggle to transfer the skills that they have learnt for one game to another, different game. For example, in known systems, a neural network may need to be trained from scratch, each time a new game is to be learnt.

In some cases, the bot may play in a manner that feels different from, or is not matched to, a real player. This can be undesirable where, for example, a player wishes to emulate the experience of playing against a friend, but that friend is currently unavailable for playing the game.

The present invention therefore seeks to address or mitigate these problems.

SUMMARY OF THE INVENTION

According to a first aspect disclosed herein, there is provided a system for generating an input signal for a video game in accordance with claim 1.

According to a first aspect disclosed herein, there is provided a method for generating an input signal for a video game in accordance with claim 8.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
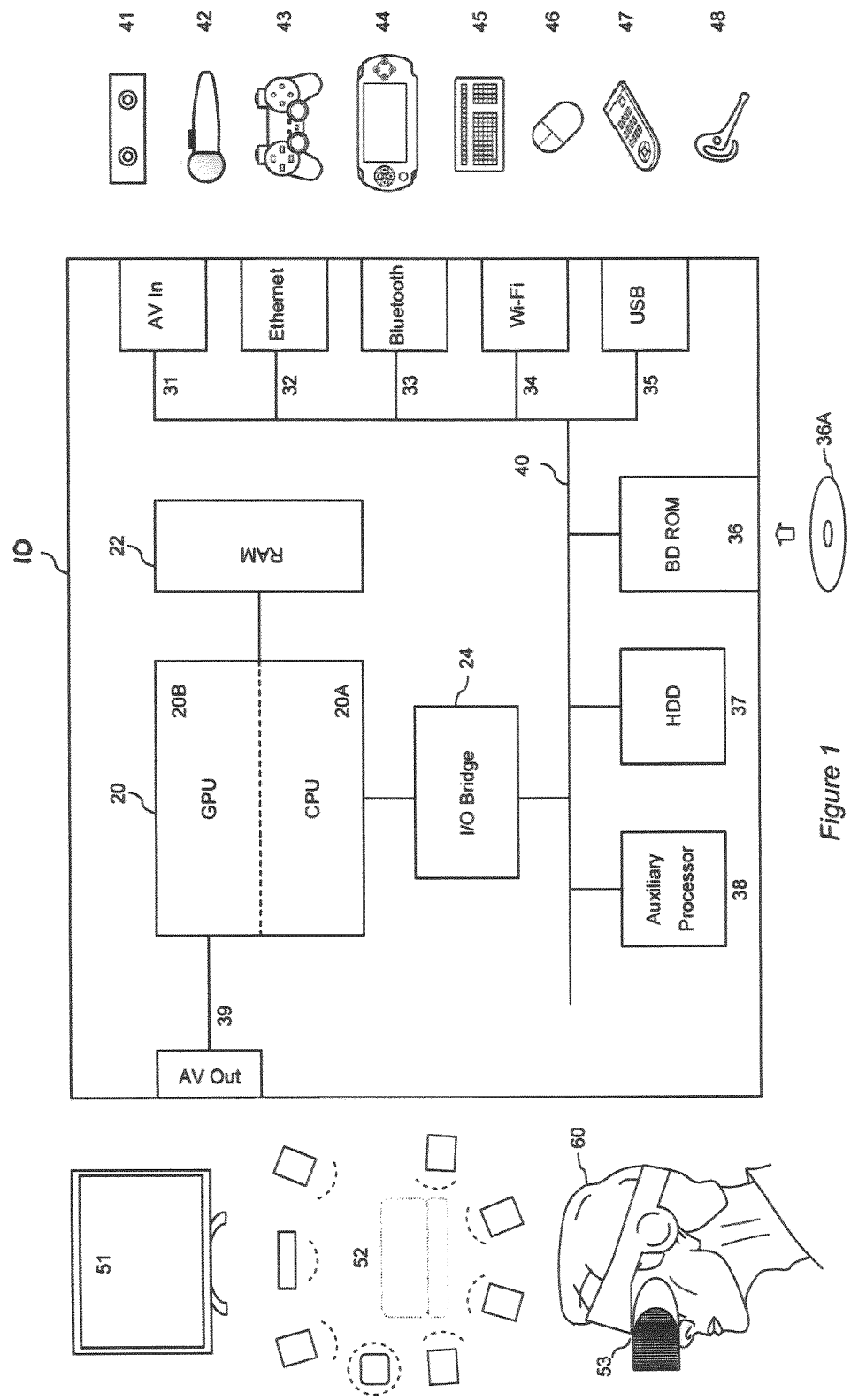
FIG. 1 shows schematically an example of a video game playing device.

Referring now to the drawings, wherein like reference numerals designate identical or corresponding parts throughout the several views, a system and method are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

A system that may employ the method(s) described herein will typically be a server or a similar or similar general-purpose computer running suitable software instructions encapsulating the method(s), and operated by a service provider to which a video game playing device owned by a user may connect, for example via a network such as the Internet. Typically the server or general-purpose computer will be responsible for collecting data from a plurality of video game playing devices and using this to train an artificial intelligence (as will be described below). Generally, this training of the artificial intelligence will be achieved using one or more graphics processing units (GPU) or tensor processing units (TPU).

Hence it will be appreciated that the method(s) described herein may be carried out on conventional hardware suitably adapted as applicable by software instruction or by the inclusion or substitution of dedicated hardware. Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Once trained, the trained artificial intelligence can be exported to a video game playing device. This may be provided as, for example, a software update with the trained artificial intelligence being downloaded to the video game playing device as part of the software update.

Additionally or alternatively, the trained artificial intelligence may be accessed by the video game playing devices via e.g. an application programming interface (API). For example, the video game playing devices may be configured to make API calls to the server in real-time, and in response thereto, to receive outputs from the artificial intelligence.

Alternatively or in addition, the system may comprise the videogame playing device owned by the user. Alternatively or in addition, both the videogame playing device and the server may operate cooperatively to implement the method(s) or the videogame playing device may implement the method(s) locally.

As an example of a videogame playing device, and also in general terms of a general purpose computer or server, FIG. 1 schematically illustrates the overall system architecture of a Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. 25 The APU 20 has access to a random access memory (RAM) unit 22.

The APU 20 communicates with a bus 40, optionally via an I/O bridge 24, which may be a discrete component or part of the APU 20.

Connected to the bus 40 are data storage components such as a hard disk drive 37, and a Blu-ray® drive 36 operable to access data on compatible optical discs 36A. Additionally the RAM unit 30 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi wireless link 34, 5 or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4 ®; portable 10 entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features 25 and to select games and optionally other content.

Figure 2:
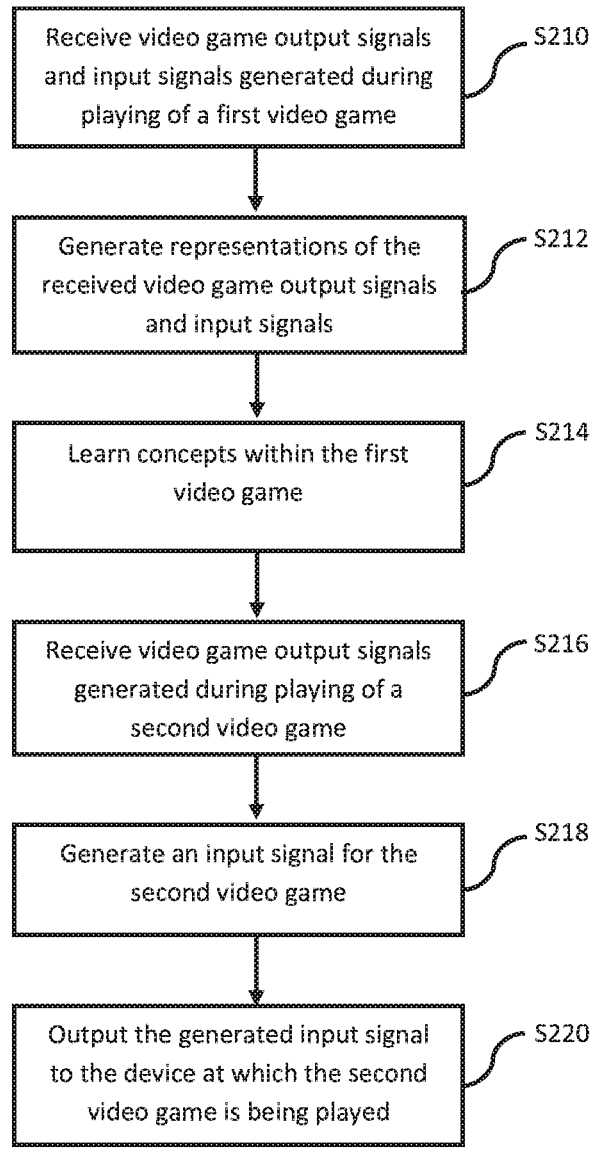
FIG. 2 shows schematically an example method of generating an input signal for a second video game, whilst the second video game is being played.

Referring now to FIG. 2, an example of a method for generating an input signal in accordance with the present invention is described.

In a first step S210, signals generated for a first video game and input signals generated by players during playing of the first video game are received.

The signals generated for the first video game may include, for example, video signals. The video signals may correspond to sequences of frames that were output by the video game playing devices during playing of the first video game. In some examples, the signals may include audio signals. For example, the first video game may require a player to respond to certain audio outputs, during the game. Generally, the signals generated for the first video game may correspond to any kind of output (i.e. of the video game playing device) that a player is presented with, whilst playing the first video game. In some examples, the signals generated for the first video game may include additional information relating to the content that is being output by the video game playing device.

To assist in understanding the present invention, embodiments will be described primarily in relation to video signals. However, it will be appreciated that the principles taught herein may equally be applied to audio signals, and indeed other types of output of the video game playing device that a player is presented with. For brevity, the signals generated for the first video game are herein referred to as 'video game output signals'.

Hence the signals may also include game related status information that is not normally displayed or made accessible to a player, but could be accessible to a subsequently trained AI running on a server or entertainment device or server as described above. Such information may include, as non-limiting examples, non-player character (NPC) movement paths, directions of camera and/or player travel, in-game co-ordinates of players, NPCs and/or other in-game objects, clipping information indicative of constraints upon motion in a given direction, the current pose of the player character (which may assist with image analysis or be indicative of how the game is responding to current or recent inputs), and the like.

The input signals correspond to player inputs that were received at the video game playing devices whilst the first video game was being played. As will be appreciated, for a given video signal there will be a corresponding input signal that indicates the inputs that were received during output of the video signal. In some examples, the input signal provides an indication of the controller inputs that were received during playing of the first video game. For example, the controller inputs may include buttons pressed by the player and/or movement of one or more peripheral devices by the player, during playing of the first video game. It will also be appreciated that sometimes there will be no active inputs because the user in not activating any function of the controller. However, optionally this may still be treated an informative input signal in its own right.

In additional or alternative examples, the player inputs may correspond to audio received at e.g. a microphone associated with the video game playing device. For example, certain video games may require a user to provide an audio input such as a human speech. In still further examples, the player inputs may correspond to e.g. movements of the player, captured by e.g. a camera associated with the video game playing device. The movements may include movement of one or more of the player's limbs, or e.g. changes in the facial expression of the user. To assist in understanding the present invention, the embodiments described herein will be largely in reference to player inputs be provided by means of a controller device, such as a games controller and/or a peripheral device. Optionally, these signals may have already gone through some form of pre-processing. For example, audio inputs may be converted for other purposes to a Mel-Cepstrum representation, prior to any further optional feature extraction is performed for the purposes of presenting inputs to an AI. Similarly, video inputs may be converted for other purposes to isolate moving features of an image, or identify the location of one or more controller in the image, or to generate a skeletal model of a user prior to any further optional feature extraction is performed for the purposes of presenting inputs to an AI. However, in such cases these pre-processed representations may be used alternatively or in addition to raw or conventionally encoded audio or video signals.

In some examples, there may be a separate input signal for each type of input that is received from a player during the playing of a video game. In other examples, an input signal may provide an indication of multiple different inputs that were received from a player during gameplay.

The video game output signals and the input signals may be received at a receiving unit located at e.g. a server. These signals may be sent to the server over a network, such as, for example, the PlayStation™ network. In other examples, the videogame playing devices may be connected to the server or a general-purpose computing device via a local network.

In a second step S212, respective representations of the video game output signals and the input signals are generated. The representations may define e.g. the semantic content of the video game output signals and the input signals. For example, a sequence of frames in which an Aston Martin Vulcan is navigating a right bend in the game Gran Turismo Sport may be represented as (semantically) corresponding to a 'car turning right'. Similarly, a set of button presses may be represented (semantically) as corresponding to e.g. 'turning right' or 'jumping'. These representations may be marked up manually for a training sequence, or may be represented in a machine readable fashion automatically by data accessible from the videogame in a similar manner to that described previously herein in relation to game related status information (for example 'game object ID @ location X,Y,Z, in pose #5'). Similarly, key or button mappings may be obtained from in-game data relating controls to functional descriptions, typically provided to assist the user (e.g. on a help screen). These descriptions are often generic in nature or can be mapped to generic/universal descriptors.

At a third step, S214, concepts within the first video game are learnt, based on the representations of the video game output signals and input signals. Here 'learning', typically means determining, for a given output of the video game, a corresponding input signal that is likely to be generated by a player in response to that output. For example, the system may determine that, for a given frame or sequence of frames, a corresponding a button press or combination of button presses is expected. This relationship may be defined in terms of e.g. a function that maps video game output signals to corresponding input signals.

The above may be done for instance by training an AI to predict inputs based on current or historic outputs, with the actual inputs used as the target and basis for a suitable error function. As noted herein, the inputs may be translated to a universal or generalised representation that is not game specific, and similarly the outputs may be a combination of raw, encoded, and/or pre-processed video and/or audio, and/or semantic representations of such output signals.

In a fourth step S216, a video game output signal generated during playing of a second video game, is received. This signal may correspond to e.g. a video signal output by the device on which the second video game is being played. The video game output signal for the second video game may be received at, for example, a second receiving unit that is separate from the first receiving unit. Alternatively, the second receiving unit may be part of a general receiving unit that includes both the first and second receiving units, and may be located at a server, as described previously.

In a fifth step, 218, an input signal is generated, based on the video game output signal received for the second video game and the learning performed for the first video game. This learning is described further in relation to FIG. 3 and FIGS. 4A to 4C. In some examples, the genre of the second video game may be determined before an input signal is generated. This ensures that the input generator does not attempt to generate input signals for games where it is unlikely that the concepts learnt for the first video game are applicable.

In a sixth step, S220, the input signal generated by the input generator is output to the video game playing device at which the second video game is being played. This results in a virtual player within the second video game performing the action that corresponds to the generated input signal. For example, a video signal received at the second receiving unit may have included a car approaching a bend curving rightwards. In response to having detected this, an input signal corresponding to 'e.g. right on the analogue stick, whilst holding R1 for 2 s' may have been generated and transmitted to the relevant video game playing device. In turn, this causes the virtual player (car) to navigate the bend.

It will be appreciated that the second video game will typically be a different title to the first video game. However, it will also be appreciated that optionally the second video game may be a different instance of the original video game (for example so that a bot trained on maps released with a game may now also operate on new, player generated maps, or additional maps provided as downloadable content). Hence examples of different instances may be new levels, new maps, downloadable content, or use of a different character class that interacts with the original video game in at least a partially different manner to that used during training (for example, having access to different abilities such as being able to jump higher, but not being able to use ranged weapons).

It will be appreciated that steps S210, S212 and S214 may be performed during a training phase, whilst steps S216, S218 and S220 may be performed during an operating phase, and that the training phase and operating phase may be implemented separately and independently, for example on a server and entertainment device respectively.

In preferred embodiments, deep learning is used for generating representations and learning concepts within video games. An example system for performing this deep learning is now described in relation to FIGS. 3 and 4A to 4C.

Figure 3:
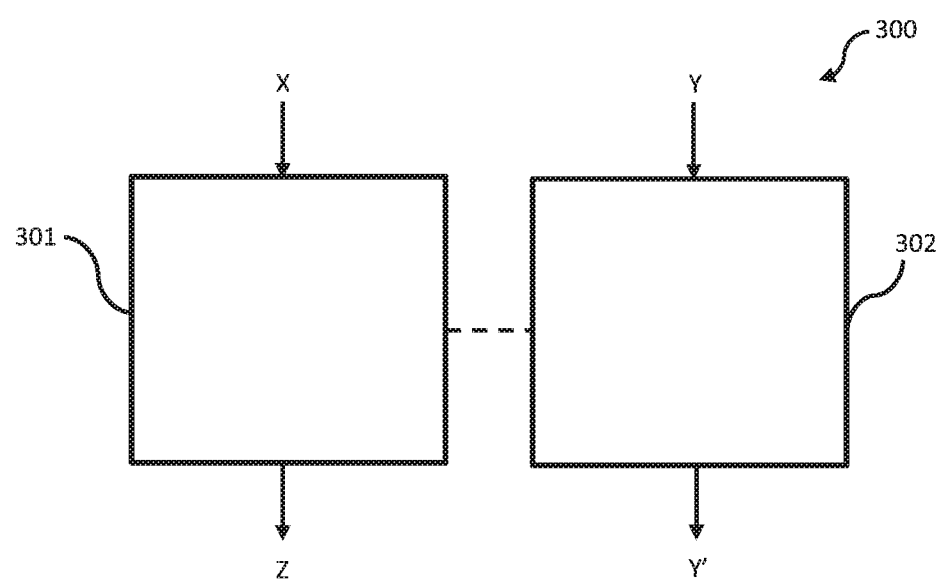
FIG. 3 shows schematically an example of a system for generating an input signal.

FIG. 3 shows schematically a system 300 for learning to play video games in a manner that is not specific to any particular video game. The system 300 comprises a first component 301 and a second component 302.

The first component 301 is configured to receive an input, input X, and in response thereto, provide an output, output Z. Input X corresponds to a video game output signal. As mentioned earlier, this may include, for example, video signals (including a sequence of frames) and/or audio signals output by a video game playing device during playing of a video game. In some examples, input X may include metadata, providing information relating to what was output by the video game playing device (e.g. type of audio, nature of game scene, text displayed to a player during gameplay etc.) whilst the video game was being played.

Output Z may include one or more of, e.g. a predicted button press that a player would make, a predicted movement of a peripheral device, a predicted physical movement that a player would make, and/or an audio signal that will be received, at the point within the video game corresponding to input X. Thus the first component 301 is configured to receive video game output signals as an input, and in response thereto, predict a corresponding input signal.

The second component 302 is configured to receive an input Y, and in response thereto, provide an output, output Y'. In the system shown in FIG. 3, the second component 302 is an auto-encoder. As is known in the art, auto-encoders are configured to learn a representation of their inputs and to re-create the inputs from the learnt representation. For this reason, the input and output of the second component 302 is denoted with the same letter.

In FIG. 3, the autoencoder is configured to receive input signals as an input and to output a reconstruction of the received input signals. As mentioned earlier, the received input signals may correspond to e.g. button presses provided by a player during gameplay, movement of a peripheral device, audio provided by a player, physical movement of the player, etc. The input signals received at the autoencoder may be considered as 'raw input signals' in that they will (generally) not have been processed before being received at the autoencoder. The output of the autoencoder can be thought of as a representation of the original input signals, in that the output has been generated from the representation learnt by the autoencoder.

In FIG. 3, the first component 301 and second component 302 are shown as being connected by a dashed line. This is because the output of the second component 302 influences the output of the first component 301. The reasons for this will become apparent from the embodiments described below.

Figure 4A:
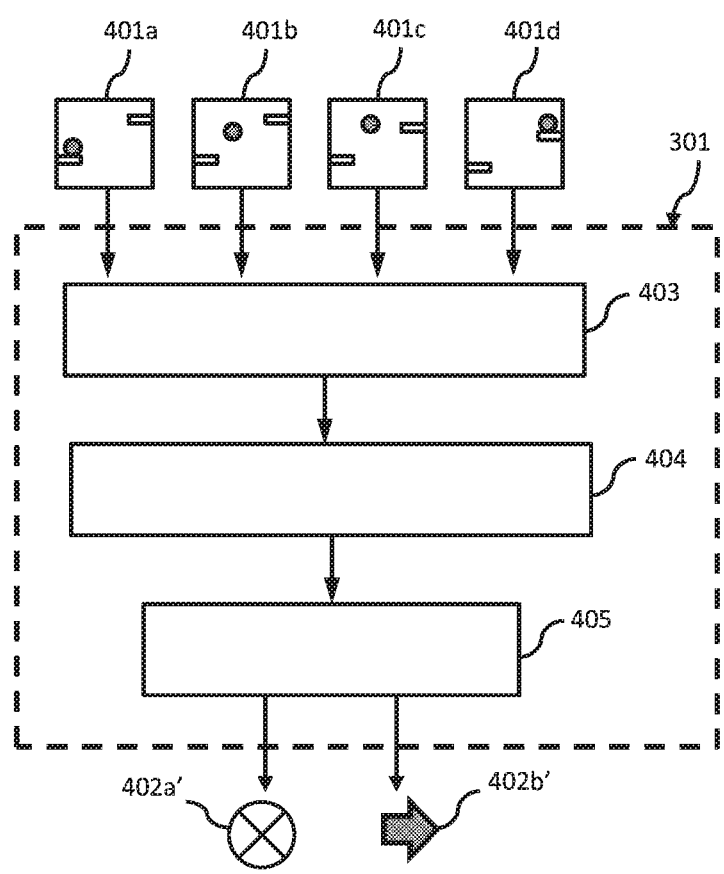
FIG. 4A shows schematically an example of a first component of the system for generating an input signal.

FIG. 4A schematically shows an example of the first component 301, and an example of the inputs and outputs of the individual components making up the first component 301.

The first component 301 comprises an input feature extractor 403. The input feature extractor is configured to receive the video game output signals and to extract from these, one or more high-level features. The extracted features may include, for example, visual features identified within one or more frames of a video signal and/or audio features identified within an audio signal.

In FIG. 4A, a video signal comprising a sequence of frames 401a, 401b, 401c and 401d is shown as being input to the input feature extractor 403. These frames depict a circular object jumping from one ledge onto another. The circular object may correspond to a character within a video game (such as the first video game, described previously). The frames may be e.g. successive frames, or frames sampled at a predetermined interval, e.g. as non-limiting examples 1, 2, 3 4, 5, . . . 50, . . . 60 frames, or every 0.1, 0.5, 1, 4 s. Other periods may be considered, depending on the nature of the game.

In the example shown in FIG. 4A, the input feature extractor 403 is configured to extract visual features from the received frames. These features may include e.g. the circular object, the ledges and their relative positions within the video image. More generally, the input feature extractor 403 extracts high-level visual features from the frames of the received video signal.

The input feature extractor 403 may consist of a neural network architecture that has been trained to identify different features within video game output signals. The neural network architecture may include e.g. a convolutional network, multilayer perception, restricted Boltzmann machine, recurrent neural network etc. The neural network will generally have been trained with a large volume of video game output signals, generated by a larger number of players during their respective video game playing sessions. The training regime may be supervised, using marked up data as described previously, or may be unsupervised and rely on innate properties of the video game output signals, such as shape, colour, motion, and correlations between features such as sounds and motion, or collocation of features and a change in game state (such as collecting a coin, or being killed). Training or may also be a mixture of the two.

The output of the input feature extractor 403 is provided as an input to a reasoning model 404. The reasoning model 404 is configured to determine an action to take, based on the high-level features extracted by the input feature extractor 403. It is important to note here that the reasoning model 404 determines an action to take based on the extracted features, and not (at least not directly) on the controller inputs received during playing of the video game. The output of the reasoning model 404 corresponds to a representation of an action to take and not to e.g. an explicit button press on a controller.

In some examples, the first component 301 may include an additional component, in the form of a context identifier (not shown). The context identifier may be configured to identify (and thereby classify) the different contexts that occur within a video game or a particular genre of video games. Each context may correspond to a point within the game where the video game output signals differ over a sequence frames by an amount that is larger than a threshold amount. Such a difference in the video game output signals will generally indicate that something of interest is occurring within the game scene.

For example, when a player's avatar is remaining stationary within a virtual environment, it is expected that the video images and/or audio output by the video game playing device will remain somewhat similar over a sequence of frames. The context identifier may be therefore be configured to identify situations, i.e. contexts, where this is not the case. The context identifier may identify these contexts based on the features extracted by the input feature extractor 403, for example.

In the example shown in FIG. 4A, the context identifier may determine that if an initial frame, i.e. 401a, includes a lower ledge and an upper ledge with a player on the lower ledge, the subsequent frames will include the player jumping from the lower ledge to the upper ledge (as shown). The context identifier unit may therefore classify this as a particular context. Should the same or a similar context occur again (be that in the same game or a different video game), the action identification unit may provide an indication that such a context has occurred to the reasoning model 404. The reasoning model 404 may then determine that it is an appropriate time to take an action.

In other examples, the first component 301 may not include a context identifier. In these examples, the reasoning model 404 may simply receive an indication of the extracted features from the input feature extractor 403, and in response thereto, determine an action to take (including taking no action). The action that the reasoning model 404 determines to take will be updated as the system is trained with more and more data (as will be described further, below).

The output of the reasoning model 404 is provided to an encoder 405. The encoder 405 is configured to generate an input signal, based on the input received from the reasoning model 404. In the example shown in FIG. 4A, this corresponds to translating the representation generated by the reasoning model 404 into video game specific input signal. In FIG. 4A, the encoder 405 is shown as outputting button presses corresponding to pressing of the 'x' button 402a' and right with the d-pad/analogue stick, represented as arrow 402b'.

As will be appreciated, in order to accurately predict an input signal based on e.g. the visual content of a video game, the encoder 405 will need to know some information about the controller inputs that were received whilst the video game was being played. The acquisition and use of this information will now be described.

Figure 4B:
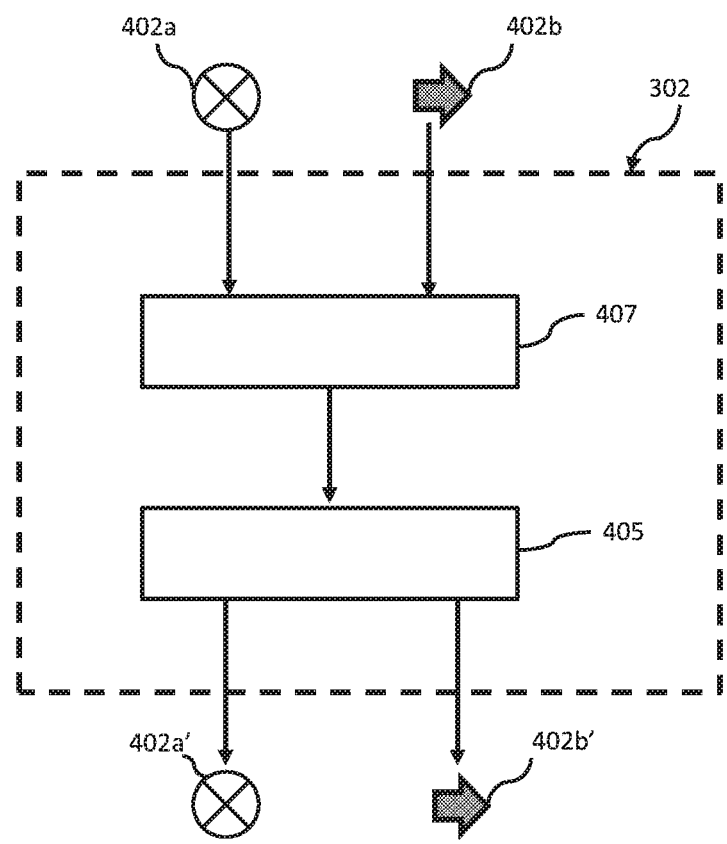
FIG. 4B shows schematically a second component of the system for generating an input signal.

FIG. 4B schematically shows an example of the second component 302 of the system described in FIG. 3. As described previously, the second component 302 comprises an autoencoder.

In FIG. 4B, two input signals are shown as being received during the outputting of at least one of the frames in the sequence of frames 401a-401d. These input signals correspond to a player having pressed the 'x' button and having moved the right analogue stick to the right. In this example, these button presses cause a character on a lower ledge to jump up on to an upper ledge that is above and to the right of the lower ledge.

The input signals are received at a decoder 407. The decoder 407 is configured to generate a representation of the received input signals. This representation may correspond to e.g. a feature vector representing the most salient features defining the received input signals. The feature vector may not necessarily be specific to a particular video game. For example, the decoder 407 may be configured to receive input signals generated during multiple videogame playing sessions of a video game, or a particular genre of video games, and to represent these in a video game independent manner Semantically, this may correspond to generating a representation for 'jumping' as opposed to e.g. storing the explicit button presses that cause jumping for each video game in a particular genre.

As will be appreciated, in some games, a button on a controller may have multiple different functions, depending on the context within the game. In such games it may be necessary to generate representations of the input signal based on both the button that was pressed and what was displayed at the player's screen, at that time. For example, the video game represented in FIG. 4A may include parts where a character navigates an environment by foot and other parts where the character navigates the environment by car. In such a game, pressing 'x' and 'right' may correspond to jumping onto a ledge in one context, and navigating a right turn in a road in another.

To ensure that both of these situations are represented differently, the decoder 407 may be configured to receive the video that was output, whilst input from a player was received at the video game playing device, and/or any other suitable game state information that may be accessible during subsequent operation of the system. The decoder 407 may then use both the received player input and corresponding video content and/or state information to generate a representation of the player input that was received. In some examples, the time at which the player input was received may be used to generate the representation of the input signals.

The representation generated by the decoder 407 is provided as an input to the encoder 405. The encoder 405 is configured to generate an input signal based on the representation generated by the decoder 407. In other words, the encoder 405 is configured to re-create the original inputs from the representation of those inputs generated by the decoder 407.

In some examples, the decoder 407 and encoder 405 of the autoencoder are trained using sequence-to-sequence learning. For example, both the decoder 407 and the encoder 405 may comprise neural networks (each having the same structure, but oriented in opposite directions). The output of the decoder 407 may be used to train the neural network of the encoder 405. The degree to which the output of the encoder 405 matches the original controller inputs can be used to determine whether or not the decoder 407 and the encoder 405 have been sufficiently trained (e.g. using back-propagation). Once sufficiently trained, the encoder 405 is employed as part of the first component 301, as will be described below.

In FIG. 4B, the encoder 405 is shown as outputting input signals corresponding to pressing of the 'x' button 402a' and moving e.g. an analogue stick to the right 402b. In this example, the input signals output by the encoder 405 correspond to the input signals that were received at the decoder 407. This corresponds to the situation where the decoder 407 and encoder 405 have been sufficiently trained.

The system shown in FIG. 3 (which itself comprises the components described in FIGS. 4A and 4B) requires two training phases.

In a first training phase, the second component 302 learns to generate representations from which the original input signals can be reconstructed by the encoder 405.

In a second training phase, the output of the trained second component 302 is used to train the first component 301. The output of the second component 302 provides an objective for the first component 301, i.e. the outputs of the first component 301 should match the outputs of the second component 302. In FIG. 3, this corresponds to output Z matching output Y'. In such a case, this means that the input signal(s) output by the first component 301 correspond to the input signal(s) output by the second component 302.

The first component 301 can be trained by comparing the output of the second component 302 with the output of the first component 301. For example, the degree to which the two outputs match can be fed back into the first component 301, e.g. via backpropagation. Through this back-propagation the reasoning model 404 can learn to generate representations that are more likely to result in the encoder 405 of the first component 301 generating an output that matches the output of the second component 302.

In some examples, back-propagation may also be used to train the input feature extractor 403 and/or encoder 405 of the first component 301. For example, all of the components of the first component 301 may be trained together, based on the degree to which the output of the first component 301 matches the output of the second component 302. At a general level, this involves learning the internal representations that result in the first component 301 outputting an input signal that matches the input signal output by the second component 302. These internal representations may be learnt for the input feature extractor 403 and/or the encoder 405 (as well as the reasoning model 404).

It should be noted that the encoder 405 of the first component 301 is the same as the encoder 405 of the second component 302. However, the first component 301 employs the trained version of the second component's encoder 405. This is indicated in FIGS. 4A and 4B, where the encoder 405 in each component is denoted with the same reference numeral.

The use of the encoder 405 in this way, along with the training described above, introduces the following constraints:
 i. The encoder 405 learns to handle the representations output by decoder 407, these representations being video game independent;
 ii. The reasoning model 404 learns to generate representations that the encoder 405 can handle. The second training phase forces the reasoning model 404 to generate representations that, when received at the encoder 405 of the first component 301, result in the first component 301 providing an output that matches the output of the second component 302. In turn, this constrains the reasoning model 404 to generate representations that correspond with the representations generated by the decoder 407. The representations generated by the reasoning model 404 are therefore also video game independent;
 iii. The encoder 405 learns to handle the representations generated by the reasoning model 404, through the second training phase described above.

The training of the autoencoder, followed by training of the second component 302 therefore constrains the reasoning model 404 to learn to generate representations that are compatible with the encoder 405. The separation of the first and second component 302 also enables the first component 301 to predict input signals, without having to receive input signals during the playing of a video game.

Figure 4C:
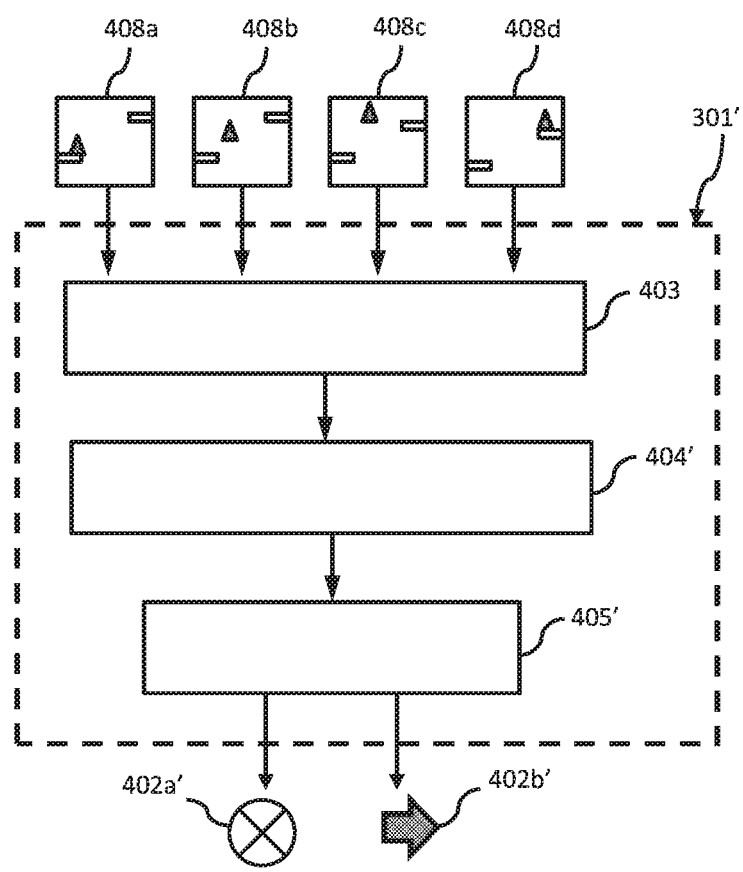
FIG. 4C shows schematically an example of a sufficiently trained first component.

FIG. 4C shows schematically an example of a trained version of the first component 301 shown in FIG. 4A. In FIG. 4C, a sequence of frames 408a, 408b, 408c, 408d are shown as being input to a visual feature extractor 403. The sequence of frames 408a-408d are shown depicting a triangular object jumping onto an upper ledge from a lower ledge. This situation corresponds to the situation shown in frames 401a-401d in FIG. 4A. However in FIG. 4C, the triangular object may represent e.g. a different character in the same video game or a different video game of the same genre.

The frames 408a-408d are processed by the input feature extractor 403, which, as described previously, extracts high-level features from the frames. In the specific example shown, this involves extracting high-level visual features such as the relative locations of the ledges and the triangular character in each frame. These extracted high-level features are then provided to the trained reasoning model 404.

The trained reasoning model 404' generates a representation, based on the high-level features extracted by the input feature extractor 403. In the example shown in FIG. 4C, this results in the reasoning model 404' generating a representation corresponding to 'jumping from a lower ledge to an upper ledge above and to the right of the lower ledge'. This representation is then received at the trained encoder 405'.

The trained encoder 405' translates the received representation into an input signal, i.e. a predicted input signal. In the example shown, this results in the encoder 405' outputting an input signal corresponding to the pressing of the 'x' button 402a' and pressing right on the d-pad/with the analogue stick 402b'. In the video game shown, this may result in the character jumping from the lower ledge up onto the upper edge. The encoder 405' may therefore be thought of as translating the vide-game independent representation generated by the reasoning model 404 into an input signal that is specific to the video game being played.

As will be appreciated, different video games will have different features. For example, a newer version of a video game may include features that are not present in the previous version of the video game. Moreover, different video games may be associated with different controls, for example, the same action may be associated with different controller inputs in different games. Hence, there may be situations where, for example, further training of the first and second components is required.

However, it is expected that the amount of training required to handle such differences will be less than what is required for known systems. This is because the dependency of the system on specific video games is largely limited to just the encoder and the decoder. The reason being that these components receive the input signals generated during game play, and the input signals received for one video game are less likely to be relevant to the input signals received for another, different video game. Hence, there may be a need to re-train the autoencoder, each time a new video game is encountered. This, in turn, allows the encoder to translate the outputs of the reasoning model into an input signal that is specific to a particular video game.

The input feature extractor 403 will have a low dependency on a specific video game because it has been trained to identify generic features, such as visual features, within the video game output signals. Similarly, the reasoning model will have a low dependency on a specific video game because it has been trained to take generic actions, in response to the generic, high-level input features identified by the input feature extractor 403. Hence, assuming that these high-level features and corresponding actions are relevant to a different video game, it is only the translation of these generic actions into specific e.g. controller inputs that may need to be further learnt by the system. To do this, the encoder and decoder will need to be re-trained with the different controller inputs, and the output of the controller encoder used to train the first component 301, as described earlier in relation to FIGS. 4A-4C.

In some cases, further training of the input feature extractor 403 may be required, i.e. where a game includes visual features that are substantially different from what has been seen previously. Similarly, the reasoning model may require further fine-tuning if the different (i.e. second) video game includes actions that have not yet been encountered during training of the reasoning model.

In some examples, the system may include an input feature autoencoder. For example, a visual autoencoder. The input feature autoencoder may be trained in the same way as the autoencoder described previously, but with the video game output signals and not with the input signals. Once trained, the input feature autoencoder can be used to train the input feature extractor 403 separately from the reasoning model. This training may involve comparing the output of the trained input feature autoencoder with the output of the input feature extractor 403 (i.e. in the same manner that the output of the second component 302 is used to train the reasoning model of the first component 301). Training the input feature extractor 403 in this way allows the training of the input feature extractor 403 to be separated from the reasoning model. This may be useful, where for example, only one of the reasoning model and input feature extractor 403 requires further training.

Nonetheless, it should be possible to update the system to handle new features found in different video games (i.e. video games the system has not yet encountered). This may be achieved by monitoring the video game output signals and input signals generated during playing of the different video game for a large number of different players. The larger the number of players monitored, the more likely it is that the system will encounter the new game features (and more frequently). The video game output signals and input signals can therefore be used to update one or more components of the system, in any of the manners described above.

By updating the system in this way, the amount of learning required by the system is limited to just the new features of the different video game. The features previously learnt by the system need not be re-learnt if these are also present in the different video game. This means, for example, that a games developer need not start from scratch when coding e.g. a virtual opponent for a player to play against in the different video game. Instead, the games developer may only need train the system with the different video game for a relatively short period following its release (assuming a good uptake by players), in order to accommodate the new features.

The system described above allows full transfer learning of the concepts learnt for one video game, to be applied to another different video game. By representing actions to be taken within a video game in a video game independent manner (i.e. as representations) and by separating the learning of the controller inputs from the rest of the system (i.e. via the second component 302), the same reasoning model can be used for multiple different video games of a particular genre. This avoids the need of having to retrain the entire system from scratch, each time input signals are to be generated for a different video game. Moreover, the system requires substantially less training data in order to be able to learn to play different video games (but preferably, of the same genre).

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system for generating an input signal for a video game, the system comprising:
a receiving unit configured to receive a video game output signal output by a video game playing device during the playing of a video game;
a reasoning model configured to determine an action to take within the video game based on the received video game output signal, the reasoning model being configured to generate an independent representation of the determined action that is generalized and not specific to the video game;
an encoding unit configured to translate the independent representation into an input signal and to provide the input signal to a video game playing device at which the video game is being played, thereby causing the determined action to be performed within the video game; and
an autoencoder configured to receive input signals generated by players during the playing of a video game and to output respective representations of the received input signals,
wherein the encoding unit is trained as part of the autoencoder, prior to the video game output signals being received at the receiving unit, and
wherein the reasoning model is trained to generate representations based on a comparison of the output of the autoencoder with an output of the encoding unit, the reasoning model being trained with video game output signals that correspond with the input signals received at the autoencoder.

2. The system according to claim 1, wherein the video game output signals comprise at least one of video signals and audio signals output by the videogame playing device.

3. The system according to claim 1, comprising an input feature extractor, the input feature extractor being configured to extract high-level features from the video game output signals; and wherein the reasoning model is configured to generate a representation based on an input received from the input feature extractor.

4. The system according to claim 1, wherein the input signal is indicative of at least one of:
i. an input received from a player via a peripheral device that is in communication with the video game playing device;
ii. audio received via one or more microphones associated with the video game playing device; and
iii. physical movement of a player captured by a camera associated with the video game playing device.

5. A method for generating an input signal for a video game, the method comprising:
receiving video game output signals generated during the playing of a video game on a video game device;
via a reasoning model, determining an action to take within the video game based on the received video game output signals; and generating an independent representation of the determined action that is generalized and not specific to the video game being played;
translating the independent representation into an input signal;
providing the input signal to a video game playing device at which the video game is being played, thereby causing the determined action to be performed within the video game; and
autoencoding by receiving input signals generated by players during the playing of a video game and outputting respective representations of the received input signals,
wherein the translating includes training the autoencoding, prior to the video game output signals being received at the receiving unit, and
wherein the reasoning model is trained to generate representations based on a comparison of the output of the autoencoder with an output of the encoding unit, the reasoning model being trained with video game output signals that correspond with the input signals received at the autoencoder.

6. The method according to claim 5, comprising: training a reasoning model to generate the representations of the determined action, based on an output of the autoencoding.

7. The method according to claim 6, wherein the autoencoding includes decoding and encoding; and wherein the trained encoding is used to translate the representation of the determined action into an input signal that is to be provided to the video game playing device.

8. The method according to claim 7, wherein sequence to sequence learning is used to train the autoencoder.

9. The method according to claim 5, wherein the video game output signals comprise at least one of video signals and audio signals output by the videogame playing device.

10. The method according to claim 5, comprising identifying one or more features within the received video game output signals; and wherein the determined action is based on the one or more features identified from the video game output signals.

11. The method according to claim 5, comprising:
determining a genre of the video game for which video game output signals have been received; and
determining whether the genre of the video game corresponds to a genre of video games for which actions have been previously determined and if it is, generating a representation of the determined action.

12. The method according to claim 5, wherein the input signal is indicative of at least one of:
  i. an input received from a player via a peripheral device that is in communication with the video game playing device;
  ii. audio received via one or more microphones associated with the video game playing device; and
  iii. physical movement of a player captured by a camera associated with the video game playing device.

13. A non-transitory, computer readable recording medium having computer executable instructions stored thereon, and which when executed by a computer system, cause the computer system to generate an input signal for a video game by carry out actions, comprising:
receiving video game output signals generated during the playing of a video game on a video game device;
via a reasoning model, determining an action to take within the video game based on the received video game output signals; and generating an independent representation of the determined action that is generalized and not specific to the video game being played;
translating the independent representation into an input signal;
providing the input signal to a video game playing device at which the video game is being played, thereby causing the determined action to be performed within the video game; and
autoencoding by receiving input signals generated by players during the playing of a video game and outputting respective representations of the received input signals,
wherein the translating includes training the autoencoding, prior to the video game output signals being received at the receiving unit, and
wherein the reasoning model is trained to generate representations based on a comparison of the output of the autoencoder with an output of the encoding unit, the reasoning model being trained with video game output signals that correspond with the input signals received at the autoencoder.

* * * * *